(12) United States Patent
Meyers et al.

(10) Patent No.: US 7,006,116 B1
(45) Date of Patent: Feb. 28, 2006

(54) TANGIBLY ENCODED MEDIA IDENTIFICATION IN A BOOK COVER

(75) Inventors: Stephan Meyers, Tampere (FI); Hannu Nieminen, Lempäälä (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/441,271

(22) Filed: Nov. 16, 1999

(51) Int. Cl.
 G09F 1/16 (2006.01)
(52) U.S. Cl. ...................................... 345/901; 713/184
(58) Field of Classification Search ............... 345/901, 345/7, 8, 905; 434/317; 340/5.74, 286.02; 713/184, 183, 185, 200–202, 168; 380/52
See application file for complete search history.

(56) References Cited

U.S. PATENT DOCUMENTS

| | | | | |
|---|---|---|---|---|
| 5,167,508 A | * | 12/1992 | Mc Taggart | 434/317 |
| 5,761,485 A | * | 6/1998 | Munyan | 345/839 |
| 5,776,278 A | * | 7/1998 | Tuttle et al. | 156/213 |
| 5,810,604 A | * | 9/1998 | Kopp et al. | 434/317 |
| 5,847,698 A | * | 12/1998 | Reavey et al. | 345/173 |
| 5,956,048 A | * | 9/1999 | Gaston | 345/507 |
| 6,168,084 B1 | * | 1/2001 | Mish | 235/492 |
| 6,327,459 B1 | * | 12/2001 | Redford et al. | 434/307 R |
| 6,460,138 B1 | * | 10/2002 | Morris | 713/184 |

OTHER PUBLICATIONS

E. Tehmi Post and Maggie Orth, Smart Fabric, or "Wearable Clothing", Oct. 1997, pp. 167 and 168.*

* cited by examiner

Primary Examiner—Xiao Wu
Assistant Examiner—Kevin M. Nguyen
(74) Attorney, Agent, or Firm—Alston & Bird LLP

(57) ABSTRACT

A system for viewing information is provided and includes an electronic book having a display and a cover containing an electronic code associated with the information. When the cover is coupled to the electronic book, the information is viewable in the display and when the cover is not coupled to the electronic book, the information is not viewable in the display.

13 Claims, 2 Drawing Sheets

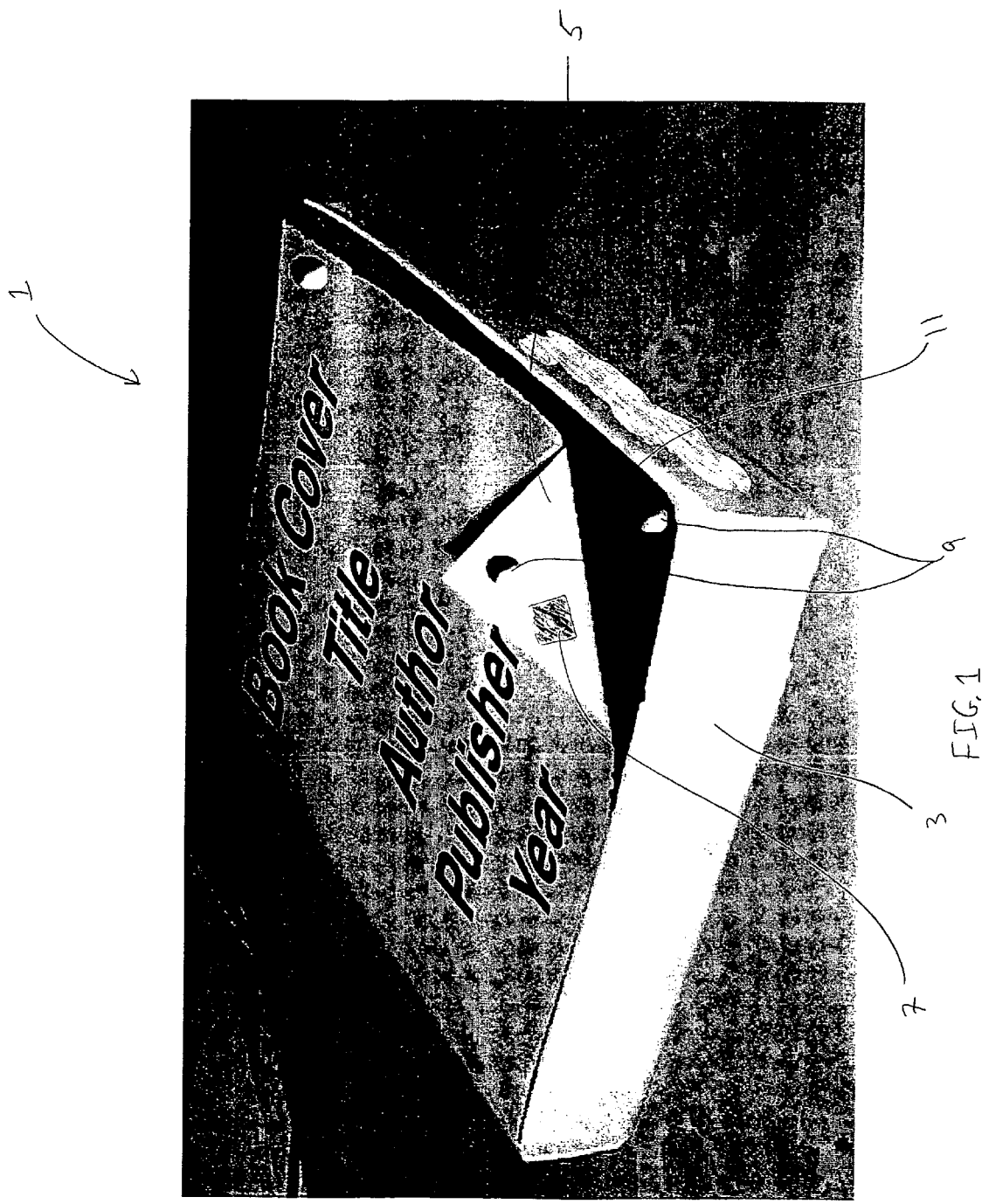

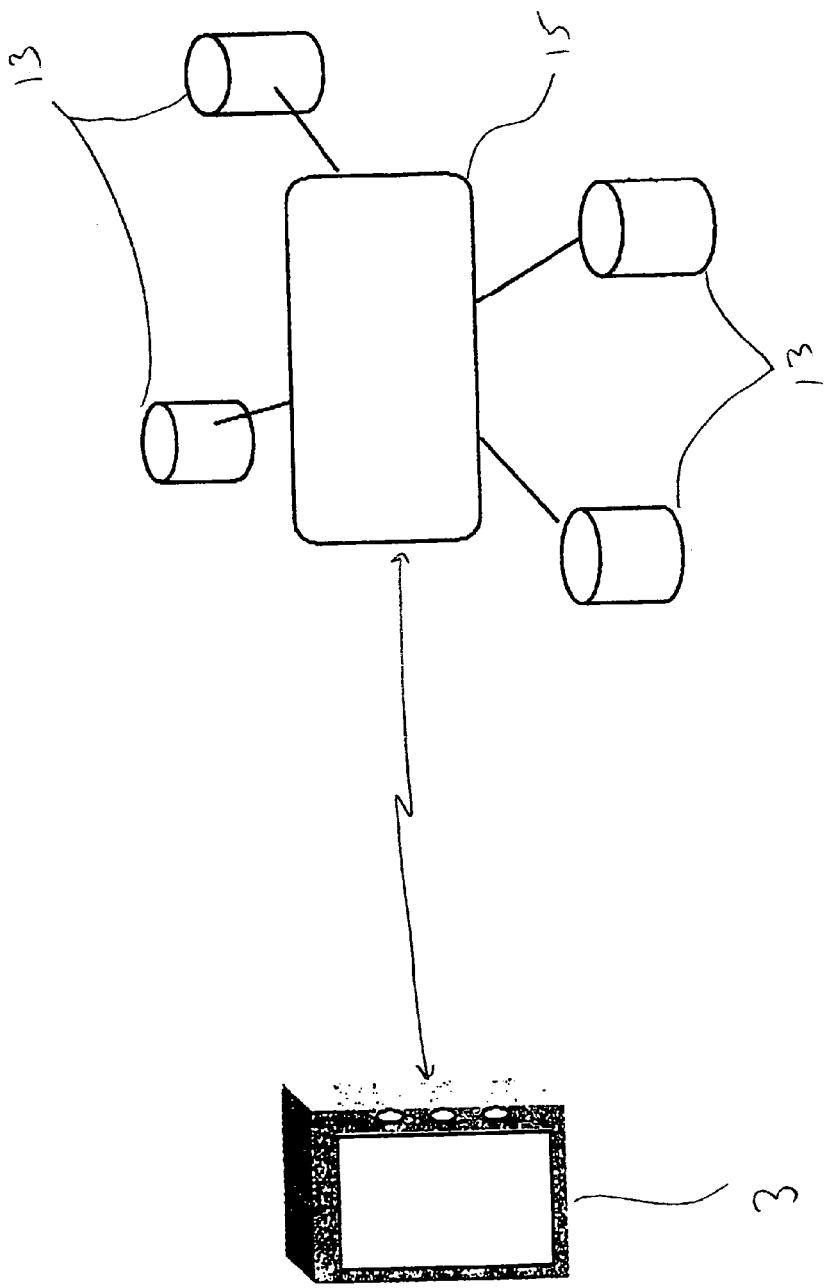

TANGIBLY ENCODED MEDIA IDENTIFICATION IN A BOOK COVER

BACKGROUND

The following invention relates to electronic books and, in particular, an apparatus for loading information in an electronic book and protecting the information from unauthorized copying.

An electronic book system is disclosed in U.S. Pat. No. 5,956,048 (the "048 patent") in which a hand-held portable display unit receives and stores information and electronically displays the information in a page-like format generally resembling a page of a conventional book. The electronic book has a size and shape comparable to the size of a paperback book and also includes sufficient memory to store, for example, the text of one or more paper-based books. Also included is a battery so that the information that is stored in the electronic book is not lost.

The user loads information into the electronic book any number of ways such as by inserting a storage medium containing information into the electronic book, by transferring information from a computer to the electronic book or by downloading information directly from the Internet to the electronic book using a modem device contained in the electronic book. Thus, an electronic book allows the user to store information in a convenient, readable and portable format. Recently, two electronic books have been commercially distributed: the first is called the Rocket eBook, manufactured by Nuvomedia, Inc. located at 310 Villa Street Mt. View, Calif. 94041, and the second is called the SoftBook Reader, manufactured by Softbook Press located at 1075 Curtis St., Menlo Park, Calif., 94205.

For electronic books to gain the necessary support of the publishers that supply the content, electronic books must provide a mechanism for protecting the information stored therein from unauthorized copying. For example, if a user purchases an electronic novel for use in the user's electronic book, the user must be prevented from making multiple copies of the electronic novel and distributing the copies to other electronic book users. Such unauthorized copying would result in lost revenues to the publisher of the electronic novel and may be a violation of the author's intellectual property rights.

To prevent unauthorized copying of information downloaded to an electronic book, the '048 discloses employing a coding system that permits either a one-time accessing of the information or limits access to the information from only the particular electronic book that first received the information. To accomplish this, each electronic book has a code programmed therein that distinguishes it from all other electronic books. When a user purchases an electronic text and uses it in a particular electronic book, the electronic book automatically embeds the code of the particular electronic book within that particular copy of the electronic text. In fact, the prior art Ebook uses such an encryption mechanism to secure the electronic text in the electronic book and prevent the viewing of the electronic text in an electronic having a different code. Similarly, the Softbook encrypts the electronic text within the electronic book so that it is only viewable by the electronic book into which the electronic text was initially downloaded. Furthermore, the Open eBook Initiative may develop an open standard for copy protection of electronically distributed literature. However, no such standard presently exists and no specific plan to develop such a standard is in place at this time.

A drawback of the unauthorized copying protection scheme disclosed in the '048 patent is that it also prevents the authorized sharing of information between electronic books. For example, if the sharing of information between electronic books is allowed by the author of that information, the mechanism of the '048 patent will prevent information already used by one electronic book from being used in second electronic book.

Furthermore, the mechanism of the '048 patent prevents the transfer of information from one electronic book to another even if no unauthorized copy is made. Once an electronic book user finishes reading a particular electronic text, the user may wish to pass the text to another electronic book user, much in the way paper-based books are transferred from one reader to the next. Because the mechanism of the '048 patent prevents such authorized transfers, the appeal of using such an electronic book is severely diminished.

Another drawback of the prior art electronic books is that they require the user to navigate a screen-oriented interface to select and download information. For example, with the Rocket eBook, the user employs a web browser to download information from the Internet to the user's personal computer. The user then downloads the information from the personal computer to the eBook. With the Softbook Reader, the user dials directly into a centralized, proprietary server and downloads information from the server into the Reader. In either case, the user is required to select the information the user desires to download from a list of available information. This process of downloading information into an electronic book is cumbersome and further detracts from the appeal of electronic books.

SUMMARY OF THE INVENTION

The present invention is directed to a system for overcoming the deficiencies of the prior art. According to the present invention, a system for viewing information is provided and includes an electronic book having a display and a cover containing an electronic code associated with the information. When the cover is coupled to the electronic book, the information is viewable in the display and when the cover is not coupled to the electronic book, the information is not viewable in the display. Because the cover is required to view the information in the electronic book, there is little incentive to make a copy of the information. Thus the unauthorized copying of the information is minimized.

In an exemplary embodiment of the present invention, a system for viewing information is provided and includes a storage unit for storing the information wherein the storage unit has the capability of transmitting the information. Also included is an electronic book having a display for viewing the information and a storage memory for storing the information. The electronic book also has the capability for receiving the information from the storage unit. The system also includes a cover having an electronic code containing a pointer to the information stored in the storage unit so that when the cover is coupled to the electronic book, the information is transferred from the storage unit to said electronic book. Once the information is transferred to the electronic book, the information is viewable in said display. Furthermore, when the cover is coupled to a second electronic book, the information is transferred from the storage unit to the second electronic book and is then viewable in the second electronic book. At that point, the information is no longer viewable in the display of the first electronic book.

Accordingly, by using the cover to cause the information to be automatically transferred from the storage unit to the electronic book, the process of storing information to the electronic book is simplified and the usability of the electronic book is greatly enhanced. In addition, because the cover is required to receive the information from the storage unit, unauthorized copying of the information is eliminated. Finally, a mechanism is provided that allows the user of the electronic book to transfer the information so that the information may be viewed by a user of a second electronic book.

The invention accordingly comprises the features of construction, combination of elements and arrangement of parts which will be exemplified in the following detailed disclosure, and the scope of the invention will be indicated in the claims.

BRIEF DESCRIPTION OF THE DRAWINGS

For a fuller understanding of the invention, reference is had to the following description taken in conjunction with the accompanying drawings, in which:

FIG. 1 is an electronic book and cover of the present invention, and

FIG. 2 is the electronic book of FIG. 1 in communications with a storage unit of the present invention.

DETAILED DESCRIPTION OF THE PREFERRED EMBODIMENTS

Referring now to FIG. 1, there is shown a system 1 of the present invention. System 1 includes an electronic book 3 that receives and stores information in a storage memory (not shown) contained therein. Information stored in electronic book 1 is viewable in display 11. Electronic book 3 is designed to display all types of information including, but not limited to, text, graphics, video and any other information that a user of electronic book 3 may desire to view. The techniques of storing and displaying information in electronic book 3 is well known to one of ordinary skill in the art.

Also included in system 1 is a cover 5. Cover 5 may be constructed from any suitable material such as, by way of non-limiting example, paper or fabric. Cover 5 also includes a tag 7 for storing an electronic code that is remotely detectable. Tag 7 may be any device that is capable of storing an electronic code that is remotely detectable, such as, for example, an integrated circuit embedded in cover 5 that stores an electronic code in a manner well know in the art. If cover 5 is made from fabric, tag 7 may consist of conductive fibers woven into the fabric in a manner that defines the electronic code. The capability of constructing electronic circuits out of fabric in which circuits are formed from components sewn from conductive yarns is disclosed in an article entitled "Smart Fabric, or Washable Computing" by E. Rehmi Post and Maggie Orth, published in an abridged form on pages 167–8 of the Digest of Papers of the First IEEE International Symposium on Wearable Computers, Oct. 13–14, 1997 in Cambridge, Mass.

If cover 5 is made from paper, tag 7 may consist of printed machine readable ink that embodies the electronic code. Such machine readable ink is well known in the art and includes the MICR ink used to encode a check number on the bottom of a check. Alternatively, tag 7 may consist of electronic circuitry that is printed on cover 7 and which stores the electronic code, a technique discussed in "When Things Start to Think," by Neil A. Gershenfeld, Henry Holt & Company (January 1999). In addition to the above examples, tag 7 may be any device or technique that may be attached or embedded into cover 5 and that can store an electronic code that is remotely detectable.

Electronic book 3 includes circuitry (not shown) that detects the electronic code stored in tag 7. The type of circuitry used to detect the electronic code in tag 7 will depend on the type of technology used in tag 7 to transmit the electronic code. For example, tag 7 may communicate with electronic book 3 via a direct electrical connection. In such a case, cover 5 will physically attach to electronic book 3 so that an electrical connection can be made between tag 7 and the circuitry within electronic book 3 for detecting the electronic code. Alternatively, tag 7 may communicate with the circuitry in electronic book 3 using inductive resonance techniques that are well known in the art and that are commonly used to protect retail consumer goods, such as books and CDs, from theft. Alternatively, tag 7 may include a capacitive element coupled thereto that transmits the electronic code stored in tag 7 to the circuitry in the electronic book using a capacitive response mechanism. An example of such a capacitive element that is suitable for tag 7 is made by Motorola, Inc. and is called BiStatix™ smart label technology. This smart label technology uses non-metallic conductive ink that may be printed on the surface of cover 5 so that it functions as an antenna to transmit the electronic code stored in the integrated circuit using capacitive coupling. If tag 7 communicates either inductively or capacitively, cover 5 does not have to be in physical contact with electronic book 3 in order for the circuitry to read the electronic code stored within tag 7.

In an exemplary embodiment, tag 7 is a web server embedded in cover 5. An example of a web server that is of a suitable dimension and shape to be attached to cover 5 is the iPic web-server recently developed by graduate student Hariharasubrahmanian Shrikumar of the University of Massachusetts. Where tag 7 is a web server then electronic book 3 includes a web browser for communicating with tag 7 and for reading the electronic code stored therein.

Cover 5 physically attaches to electronic book 3 using connector 9. Connector 9 may be any device capable of physically connecting cover 5 to electronic book 3 using any technique including, but not limited to, Velcro™ or clasps. In the embodiment where an electrical connection is required for the circuitry in electronic book 3 to read the electronic code stored in tag 7, connector 9 may be constructed from conductive elements thereby forming the necessary electrical connection between cover 5 and electronic book 3. For example, in this embodiment, connector 9 may be a conductive clasp.

Cover 5 may be attached to the side of electronic book 3 with display 11. In this embodiment, the user will peel back cover 5 in order to view the information in display 11. Alternatively, cover 5 may attach to another side of electronic book 3 so that cover 5 does not interfere with the viewing of information in display 11.

The electronic code stored in tag 7 that is embedded in cover 5 is associated with the information corresponding to cover 5. For example, if the information to be viewed in electronic book 3 is the text of a novel, then appended to the text of the novel is a code that is related to the electronic code in tag 7 of cover 5 that is associated with that particular novel. When cover 5 is coupled to electronic book 3, the circuitry reads the electronic code stored in tag 7 and compares that electronic code to the code appended to the novel stored in electronic book 3. If the electronic code matches the code, then electronic book "unlocks" the novel and allows the user to view the novel in display 11.

Alternatively, the electronic novel stored in electronic book 3 is encrypted using any known encryption techniques. When cover 5 is coupled to electronic book 3 and it is determined that the electronic code matches the code appended to the novel, the novel is then decrypted by electronic book 3 thereby allowing the user to view the novel. Alternatively, tag 7 may include a processor that decrypts the novel.

In an exemplary embodiment, when cover 5 is uncoupled from electronic book 3, the information stored in electronic book that is associated with cover 5 is no longer viewable in display 11. Thus, because it is necessary to have cover 5 coupled electronic book 3 to view the corresponding information stored in electronic book 3, the unauthorized copying of such information is eliminated.

Cover 5 may also have printed thereon material that describes the information cover 5 is associated with. So, for example, if the information associated with cover 5 is a novel, then cover 5 may have printed on it the title of the novel, the author, the year published and any other desired material including graphics and pictures.

In an exemplary embodiment, the information to be viewed in electronic book 3 is stored in a memory circuit embedded in cover 5. In this embodiment, when cover 5 is coupled to electronic book 3, the information is transferred to electronic book 3 and is viewable in display 11. Memory circuits for storing such information are well known in the art.

Referring now to FIG. 2, there is shown electronic book 3 in communications with a storage unit 13 for retrieving information from storage unit 13. In this embodiment, storage unit 13 stores information for viewing by a user of electronic book 3. Storage unit 13 also includes a mechanism for transmitting the information from storage unit 13 to electronic book 3. This mechanism can include any known or future developed technique for transmitting information from one device to another. Examples of such techniques include, but are not limited to, wireless transmission, Bluetooth, satellite transmission, dial-up and other wired connections. Likewise, electronic book 3 includes a mechanism for receiving information contained in storage unit 13. Such mechanisms may include any technique that allows electronic book 3 to communicate either directly or indirectly with storage unit 13 and receive information from storage unit 13.

In the embodiment shown in FIG. 2, electronic book 3 connects to the Internet and accesses storage units 13 that are also connected to the Internet for retrieving information from storage units 13. To retrieve information, the user couples cover 5 to electronic book 3, where cover 5 is associated with the information that user desires to view and tag 7 of cover 5 contains a pointer to the desired information stored on storage unit 13. In an exemplary embodiment, storage unit 13 is a web server and the pointer contained in tag 7 of cover 5 is a Uniform Resource Locator pointing to the desired information. Once cover 5 is coupled to electronic book 3, the information is automatically transmitted by storage unit 13, received by electronic book 3 and viewable by the user in display 11.

In the event that a user of a second electronic book desires to view the information, the user of the second electronic book couples cover 5 to the second electronic book to receive the information from storage unit 13 in the same way described above with respect to electronic book 3. Once the information is received by the second electronic book, the user of electronic book 3 is no longer able to view the information in electronic book 3. In this way, unauthorized copying of the information is eliminated.

Once the second electronic book receives the information, electronic book 3 is prevented from viewing the information in one of two ways. The first is by requiring the user of the second electronic book to couple cover 5 to the second electronic book in order to view the information. Because the second user is using cover 5, cover 5 is not available for use by the user of electronic book 3. Thus, the information stored in only one of the electronic books can be viewed at any given time.

Another way of preventing the user from viewing the information in electronic book 3 after the information is downloaded to the second electronic book is to deactivate the information in electronic book 3 the next time electronic book 3 communicates with storage unit 13. It is expected that the user of electronic book 3 will regularly connect to storage unit 13 to retrieve desirable information. As a result, storage unit 13 will keep track of which electronic book has the most recent authorized copy of the information. When electronic book 3 that has stored information that is not the most recent authorized copy connects to storage unit 13, storage unit 13 will cause that copy of information to become deactivated and no longer viewable in electronic book 3. In order to reactivate the information in electronic book 3, the user will once again couple cover 5 to electronic book 3 and connect to storage unit 13.

Accordingly, a system is provided in which the unauthorized copying of information stored in electronic book 3 is prevented. Furthermore, according to the present invention the process by which a user downloads information into electronic book 3 is greatly simplified thereby increasing the usability of electronic book 3. Finally, a mechanism is provided that allows the user of the electronic book to transfer the information so that the information may be viewed by a user of a second electronic book.

It will thus be seen that the objects set forth above, among those made apparent from the preceding description, are efficiently attained and, because certain changes may be made in the construction set forth above without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. A hand-held portable electronic display device comprising:

an electronic display;

a memory electrically coupled with said display for storing information to be displayed on said display, said memory further capable of storing protected information in an encrypted format and for storing a first decryption code associated with said protected information;

circuitry coupled with said display and with said memory for reading said first decryption code from said memory; and a connector capable of attaching a removable cover associated with said protected content to said display device, wherein said removable cover includes a tag containing a second decryption code associated with said protected information, wherein said circuitry is further capable of:

detecting said second decryption code from said tag when said removable cover is attached to said display device, comparing said first decryption code and said second decryption code, and decrypting said protected information stored in said memory for enabling display of said protected information in an unencrypted format on said display if said first decryption code is compatible with said second decryption code.

2. A hand-held portable electronic display device as claimed in claim 1, further comprising circuitry coupled with said display and with said memory capable of encrypting said protected information stored in said memory and clearing said protected information from said display if said cover is removed from said display.

3. A hand-held portable electronic display device as claimed in claim 1, further comprising a receiver for wirelessly receiving into said memory said protected information in an encrypted format and said first decryption code.

4. A hand-held portable electronic display device as claimed in claim 1, wherein said second decryption code is read from said tag through at least one of an inductive and a capacitive connection.

5. A hand-held portable electronic display device as claimed in claim 1, wherein said removable cover further includes visual indicia corresponding to said protected content for providing an association between said cover and said protected content.

6. A method for viewing protected information in a hand-held portable electronic display device comprising:

receiving protected information in an encrypted format and a first decryption code associated with said protected information;

storing said protected information and said first decryption code associated with said protected information in a memory;

detecting a tag carried by a removable cover associated with said protected information and reading a second decryption code from said tag if said removable cover is attached to said display device;

comparing said first decryption code with said second decryption code; and decrypting said protected information stored in said memory and displaying said protected information in an unencrypted format on said hand-held portable electronic display device if said first decryption code is compatible with said second decryption code.

7. A method as claimed in claim 6, further comprising encrypting said protected information stored in said memory and clearing said protected information from said device if said cover is removed from said device.

8. A method as claimed in claim 6, wherein receiving the protected information and the first encryption code comprises wirelessly receiving the protected information and the first decryption code.

9. An apparatus for covering a hand-held portable electronic display device comprising:

a cover;

a connector for removably attaching said cover to the display device; and a affixed to said cover tag containing an encryption code associated with protected information stored by the display device, wherein the encryption code of said tag is capable of being compared to an encryption code stored by the display device such that the protected information is accessible if said cover is mounted to the display device and the respective encryption codes match.

10. An apparatus as claimed in claim 9, wherein said connector comprises an electrical connector for electrically connecting said cover and the display device.

11. An apparatus as claimed in claim 9, wherein said tag comprises one of a capacitive and an inductive element.

12. An apparatus as claimed in claim 9, wherein said tag comprises a web server.

13. An apparatus as claimed in claim 9, wherein said cover comprises visual indicia corresponding to the protected content for providing an association between said cover and the protected content.

\* \* \* \* \*